(12) United States Patent
Krishnamurthi

(10) Patent No.: US 6,181,942 B1
(45) Date of Patent: Jan. 30, 2001

(54) METHOD AND APPARATUS FOR PROVIDING AN ALERT WITH INFORMATION SIGNAL BETWEEN A MOBILE SWITCHING CENTER AND A BASE STATION

(75) Inventor: Rajeev Krishnamurthi, San Diego, CA (US)

(73) Assignee: Qualcomm Incorporated, San Diego, CA (US)

(*) Notice: Under 35 U.S.C. 154(b), the term of this patent shall be extended for 0 days.

(21) Appl. No.: 09/288,348

(22) Filed: Apr. 8, 1999

Related U.S. Application Data (62) Division of application No. 08/792,554, filed on Jan. 31, 1997.

(51) Int. Cl.[7] .................................................. H04Q 7/20
(52) U.S. Cl. .................. 455/436; 455/422; 455/432; 455/439; 455/517
(58) Field of Search ........................ 455/422, 432, 455/435, 436, 437, 438, 439, 442, 443, 444, 517, 524, 525, 560, 561; 370/320, 321, 331, 332, 335, 337, 342, 349, 470, 471

(56) References Cited

U.S. PATENT DOCUMENTS

| | | | | |
|---|---|---|---|---|
| 4,599,490 | * | 7/1986 | Cornell et al. | 455/439 |
| 4,901,307 | * | 2/1990 | Gilhousen et al. | 370/320 |
| 5,267,261 | * | 11/1993 | Blackeney, II et al. | 370/332 |
| 5,511,073 | * | 4/1996 | Padovani et al. | 370/471 |
| 5,577,029 | * | 11/1996 | Lu et al. | 455/560 |
| 5,590,177 | * | 12/1996 | Vilmur et al. | 455/436 |
| 5,682,380 | * | 10/1997 | Park et al. | 455/437 |
| 5,722,074 | * | 2/1998 | Muszynski | 455/436 |

* cited by examiner

*Primary Examiner*—Nay Maung
(74) *Attorney, Agent, or Firm*—Philip R Wadsworth; Kent D Baker; S. Hossain Beladi

(57) ABSTRACT

The invention is a method and apparatus for providing an Alert With Information Message signal between a mobile switching center and a base station in a cellular communication system. The invention recognizes that current provisions of the IS-634 standard lack support for certain required functionality on the interface between a mobile switching center and a base station, or the A-Interface. An Alert With Information Message signal is introduced on the A-Interface to support the required functionality. Introduction of the Alert With Information Message provides support for reliable call processing on the A-Interface for the call waiting procedure and the hard handoff procedure.

6 Claims, 5 Drawing Sheets

PRIOR ART

FIG. 5

PRIOR ART

METHOD AND APPARATUS FOR PROVIDING AN ALERT WITH INFORMATION SIGNAL BETWEEN A MOBILE SWITCHING CENTER AND A BASE STATION

This is a divisional application of Ser. No. 08/792,554, filed Jan. 31, 1997, currently pending.

BACKGROUND OF THE INVENTION

I. Field of the Invention

The present invention relates to spread spectrum telecommunications systems. More particularly, the present invention relates to a novel and improved messaging method and apparatus in a CDMA cellular communication system.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and amplitude modulation (AM) schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

In the CDMA cellular system, a large number of mobile telephone system users, each having a transceiver, communicates through satellite repeaters or terrestrial stations which are also referred to as cells. Each cell includes a physical plant called a base station. A cell covers a limited geographic area and routes calls carried over cellular telephones to and from a telecommunication network via a mobile switching center. When a cellular telephone user moves into the geographic area of a new cell, the routing of that user's call may be eventually made through the new cell by a process called a "handoff."

A cellular telephone or, more specifically, a mobile station, broadcasts a signal that is received by a base station. The signal is then relayed to a mobile switching center which in turn routes the signal to the public switched telephone network and to telephone lines or other mobile stations. Similarly, a signal may be transmitted from the public switched telephone network to a mobile station via a base station and a mobile switching center. The communications channel allocated for communication of information between the mobile station and the base station is called the traffic channel.

The interface between the mobile station and the base station is referred to as the Air-Interface. The telecommunications industry association (TIA) has provided a standard for CDMA call processing on the Air-Interface entitled "IS-95-A Mobile Station—Base Station Compatibility Standard for Dual Mode Wideband Spread Spectrum Cellular System," hereinafter IS-95-A, which is incorporated by reference. The interface between the base station and the mobile switching center is referred to as the A-Interface. The TIA has provided for call processing on the A-Interface through the standard provided in "IS-634 Mobile Switching Center—Base Station Interface for Public 800 MHz," which is also incorporated by reference. IS-95-A and IS-634 both define the messages and signals that are sent on their respective interfaces for the operation of a CDMA cellular telephone call.

The call flow in a CDMA environment requires processing on both the Air-Interface and the A-Interface. The successful progression of a call requires that the proper messages and signals are sent at the right times on both the Air-Interface and the A-Interface. The IS-634 standard is being developed to provide for call processing on the A-Interface. A number of problems and deficiencies are present in IS-634 which currently does not support some of the necessary operations on the A-Interface. Some of these problems and deficiencies are recognized and solved by the present invention in the manner described below.

SUMMARY OF THE INVENTION

The present invention is a novel and improved method and apparatus for providing a new message on the interface between a mobile switching center and a base station, also known as the A-Interface, of a cellular telephone system. The present invention recognizes that the A-Interface, as presently defined by the IS-634 standard, does not support some of the operations necessary for reliable call processing. Introduction of the new message will provide support for required functionality on the A-Interface.

The present invention recognizes that improvements are needed for the A-Interface to reliably handle the call waiting and the hard handoff procedures. An Alert With Information Message is introduced on the A-Interface to improve the operation of these procedures.

Using the call waiting feature, a mobile station may have a first party of a public switched telephone network put on hold while being connected to a second party. If the second party hangs up, then according to the current procedure, a Release/Clear Message (or an equivalent message) is sent to the mobile station, causing the mobile station to release its traffic channel. A new traffic channel must then be reestablished to reconnect the mobile with the first party. The present invention recognizes that the current procedure is unreliable in that difficulties may arise in the process of reconnecting the mobile with the first party. Moreover, Air-Interface resources are used inefficiently as the current procedure requires the release of the traffic channel and the reassignment of a new channel. To overcome these shortcomings, an Alert With Information Message is sent on the A-Interface to the base station, triggering the transmittal of an Alert With Information Message on the Air-Interface. Upon receipt of the Alert With Information Message, the mobile station is prompted to transmit a Connect Message to the mobile switching center via a base station. The mobile switching center then reconnects the first party to the mobile station, without the need to reestablish a new traffic channel.

A hard handoff occurs in a cellular system when a mobile station moves from the coverage area of one base station to the coverage area of another base station. During a mobile station terminated call, in order for the mobile to undertake handoff, it must first receive an Alert With Information Message transmitted by the base station. Under current procedure, the Alert With Information Message is generated and transmitted solely by the base station in whose coverage area the mobile is currently located. The present invention recognizes that the current procedure may cause the hard handoff procedure to be unreliable. If the mobile moves from the coverage area of a first base station to the coverage area of a second base station, the mobile station may never receive the Alert With Information Message from the first base station, resulting in a dropped call. Thus, the present invention provides for an Alert With Information Message to be generated and transmitted by the mobile switching center. While the mobile station is moving from the coverage area of the first base station to that of the second base station, the mobile switching center transmits the Alert With Information Message to the second base station. The second base station in turn transmits an Alert With Information Message to the mobile station. Having received the Alert With Information Message, handoff can now proceed without the call being dropped.

Benefits and advantages of the present invention will become apparent from the following description of the preferred embodiment when it is considered with reference to the drawings.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
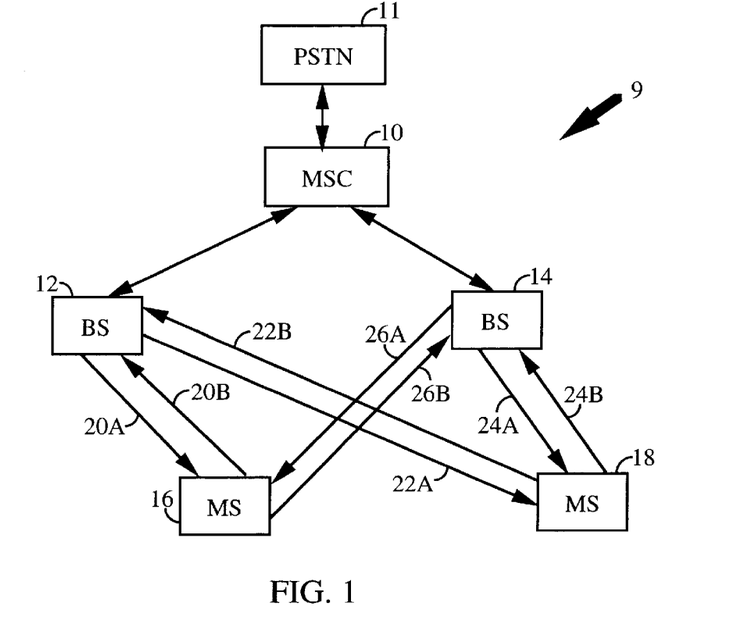
FIG. 1 is a block diagram presenting a schematic overview of an exemplary CDMA cellular telephone system in accordance with the present invention.

An exemplary CDMA cellular mobile telephone system in which the present invention is embodied is illustrated in FIG. 1. The CDMA cellular telephone system is indicated generally by 9 and includes a mobile switching center (MSC) 10, also referred to as a mobile telephone switching office (MTSO), that includes interface and processing circuitry for providing system control to the base stations. The M.SC 10 routes telephone calls from a public switched telephone network (PSTN) 11 to the appropriate base station for transmission to the appropriate mobile station. The MSC 10 also controls the routing of calls from the mobile stations via one or more base stations to the PSTN 11. In addition, the MSC 10 may direct calls between mobile stations via the appropriate base stations. The MSC 10 may be coupled to the base stations by various conventional means, such as dedicated telephone lines, optical fiber links, or by radio frequency communications.

It should be understood that although the present invention is described herein within the context of a CDMA cellular communications system, it is equally applicable to other types of communication systems, such as the personal communication system (PCS). Furthermore, systems utilizing other well known transmission modulation schemes such as TDMA and FDMA as well as other spread spectrum systems may employ the present invention.

In FIG. 1, two exemplary base stations (BSs), 12 and 14, along with two exemplary mobile stations (MSs) 16 and 18, each including a cellular telephone, are illustrated. Arrows 20a and 20b represent forward and reverse code channels that define a possible communication link between BS 12 and MS 16. Arrows 22a and 22b define a possible communication link between BS 12 and MS 18. Similarly, BS 14 can establish a two-way communication link with MS 18 as represented by arrows 24a and 24b and with MS 16 as represented by the arrows 26a and 26b.

As previously mentioned, the interface between BSs 12 and 14 and MSs 16 and 18 is called the Air-Interface, and in the exemplary embodiment, call processing on the Air-Interface is governed by IS-95-A. Also as previously mentioned, the interface between MSC 10 and BSs 12 and 14 is called the A-Interface, and call processing on the A-Interface is governed by IS-634. The present invention recognizes that the A-Interface as currently defined by IS-634 lacks support for some of the necessary functionality for reliable call processing. In addition, the present invention recognizes that introduction of a new message on the A-Interface will cure some of the deficiencies of the A-Interface.

An exemplary procedure in which deficiencies are recognized on the A-Interface is the call waiting procedure. Call waiting is one feature available to the CDMA cellular subscriber. The call waiting feature allows a cellular subscriber to toggle between two parties on the telephone network. Call waiting may be provided in a CDMA telephone system according to the techniques disclosed in copending U.S. patent application Ser. No. 8/535,998, entitled "Early Detection of Mobile to Mobile," filed Sept. 29, 1995, which is assigned to the assignee of the present invention and incorporated by reference herein.

Figure 2:
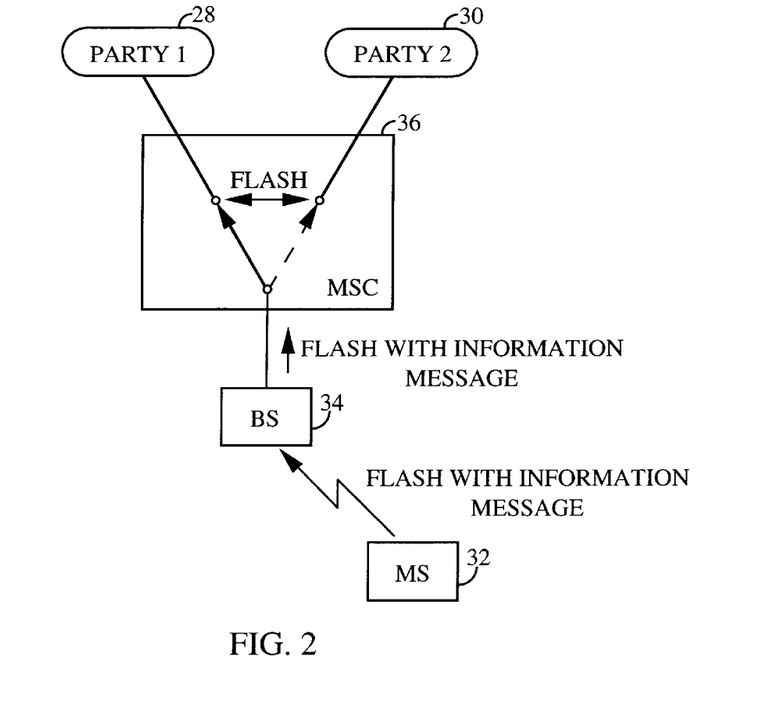
FIG. 2 is a block diagram illustrating an exemplary call-waiting scenario according to the current IS-634 standard.

An exemplary call waiting scenario is illustrated in FIG. 2. In FIG. 2, party 1 28 and party 2 30 are two parties of a PSTN. A call has been established between MS 32 and party 1 28. A traffic channel has been set up between MS 32 and BS 34 on the Air-Interface. Furthermore, BS 34 is connected to MSC 36 on the A-Interface by any of various conventional means as described above.

If party 2 30 calls MS 32 while MS 32 is communicating with party 1 28, MSC 36 will send signaling data to BS 34 indicating that another party is attempting to contact MS 32. The means for combining traffic data and signaling data is described in detail in U.S. Pat. No. 5,511,073, entitled "METHOD AND APPARATUS FOR THE FORMATTING OF DATA FOR TRANSMISSION," assigned to the assignee of the present invention and incorporated by reference herein. To inform MS 32 that another call is coming in, an alerting signal is relayed by BS 34 to MS 32 either by a Flash With Information message or an inband tone. Then, MS 32 can invoke the call waiting feature by pushing a specific key on the MS keypad. This causes the generation of a Flash With Information Message, which is sent on the Air-Interface to BS 34, which in turn relays the Flash With Information Message on the A-Interface to MSC 36. MSC 36 then connects party 2 30 to MS 32 while putting party 1 on hold. Thereafter, MS 32 may toggle between party 1 28 and party 2 30 by pushing the key on the keypad to cause the generation of the Flash With Information Message. Each time MSC 36 receives the Flash With Information Message, it connects MS 32 to the party that was previously put on hold and puts on hold the party that was previously on the line.

Referring still to FIG. 2, assume that party 1 28 is on hold and MS 32 is connected to party 2 30. If party 2 30 hangs up, then according to the current procedure, the network which is servicing party 2 generates a Release Message. This Release Message propagates to MSC 36, which then sends the Release Message to BS 34 on the A-Interface. BS 34 in turn sends a Release Message to MS 32 on the Air-Interface to cause MS 32 to release its traffic channel. MSC 36 then signals to BS 34 that party 1 28 is attempting to contact MS 32. This causes BS 34 to send a Paging message to MS 32 to indicate that a call is incoming. In response, MS 32 generates a Page Response Message which is transmitted to BS 34. BS 34 then transmits the Page Response Message to MSC 36. On receipt of a Page Response Message, MSC 36 assigns a new traffic channel to MS 32 and MS 32 is reconnected to party 1 28.

The present invention recognizes that this procedure has several shortcomings. First, it does not efficiently use the Air-Interface resource, since it requires the release of the traffic channel, re-paging of MS 32 and the assignment of a new traffic channel. Further, the need to obtain a new traffic channel makes it difficult to reestablish the connection between MS 32 and party 1 28. If MS 32 moves away from BS 34 from which it is released, the page from MSC 36 may not be received by MS 32. At the very least, this increases the amount of time that party 1 28 has to wait for the reconnection with MS 32. There is also the possibility that the connection between MS 32 and party 1 28 cannot be reestablished, resulting in a dropped call. A better procedure is needed to handle the procedure for releasing party 2 30 from MS 32 wherein MS 32 is using the call waiting feature.

Figure 3:
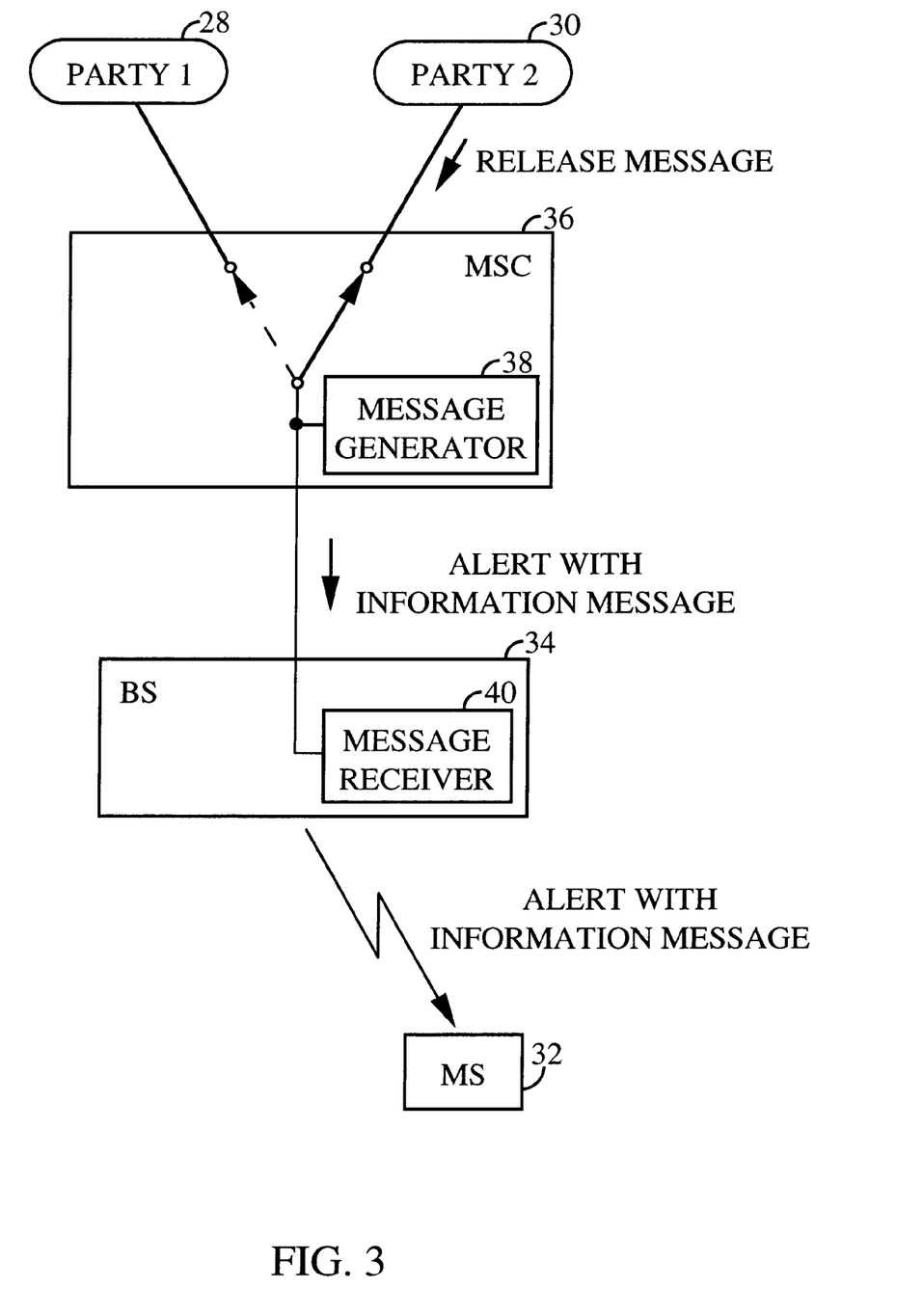
FIG. 3 is a block diagram illustrating a call-waiting scenario according to the present invention.

To overcome the shortcomings, the present invention introduces a new message for the A-Interface. A preferred embodiment of the present invention is illustrated in FIG. 3. The preferred embodiment provides for a new message, an Alert With Information Message, on the A-Interface. The Alert With Information Message is currently available on the Air-Interface under IS-95-A. According to IS-95-A, the Alert With Information Message is sent by a base station to a mobile station to cause the mobile to ring and to transition from a Conversation State to a Waiting For Answer State, expecting the mobile user to intervene. By providing for an Alert With Information Message on the A-Interface, the mobile switching center can better control the progress of the call waiting procedure.

Referring to FIG. 3, assume again that party 1 28 is on hold and MS 32 is in communication with party 2 30. If party 2 30 then hangs up, the network servicing party 2 30 generates a Release Message as described above. In the preferred embodiment, when the Release Message comes from the network, MSC 36 intercepts it, and message generator 38 in MSC 36 generates an Alert With Information Message signal, which is sent to BS 34 on the A-Interface. Message receiver 40 in BS 34 receives the Alert With Information Message, and BS 34 in turn sends an Alert With Information Message to MS 32 on the Air-Interface. When MS 32 receives the Alert With Information Message, it generates an alerting signal in the mobile and waits for the subscriber to answer. When the subscriber answers by pressing a key on keypad of MS 32, a Connect Message generated by MS 32 is sent to BS 34 and forwarded to MSC 36. On receiving the Connect Message, MSC 36 connects party 1 28 to MS 32.

In the preferred embodiment, by not permitting the Release Message (or a Clear Message) from the network to be sent to MS 32, MS 32 is not caused to release the traffic channel when party 2 30 hangs up. As a result, there is no need to expend additional Air-Interface resources for the assignment of a new traffic channel. Furthermore, the preferred embodiment does not require MS 32 to be paged following the release of the traffic channel to indicate that party 1 28 is still waiting to be reconnected with MS 32. Consequently, the risk that MS 32 will move away from the coverage area of BS 34 and not receive the page is eliminated.

Figure 4:
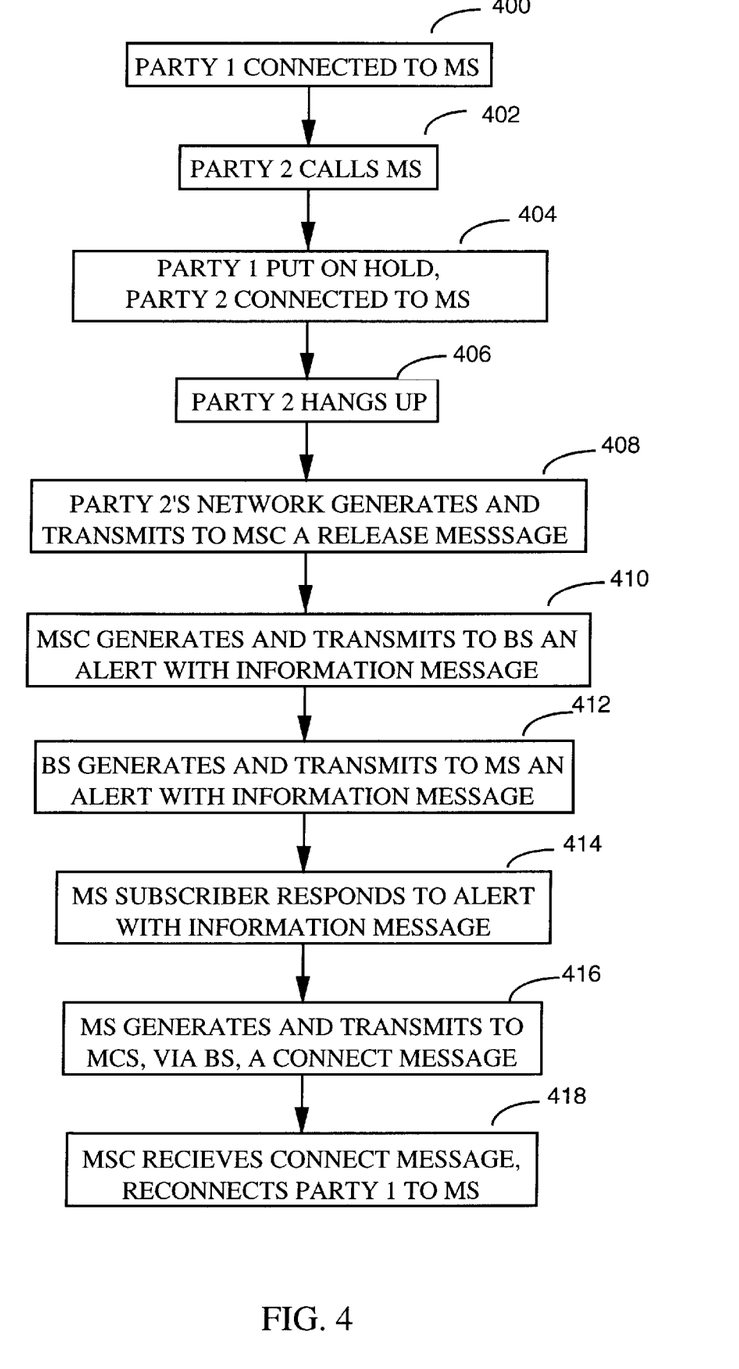
FIG. 4 is a flow chart illustrating an exemplary embodiment of the processing steps involved in call-waiting as implemented by the processing elements of FIG. 3.

A brief illustration of the steps involved in call waiting as described in the embodiment above is shown in FIG. 4. FIG. 4 shows a flow chart illustrating some of the steps involved in the processing as discussed with reference to FIG. 3.

Another procedure in which deficiencies are recognized on the A-Interface is the handoff procedure. In a cellular communication system, a handoff must take place when a mobile station moves from the coverage area of one base station to another base station. A geographic area in a cellular system is divided up into cells. Each cell is serviced by a corresponding base station. In a hard handoff environment, as a mobile station moves from one cell to another cell, communication with the original base station is terminated before communication with the subsequent base station is established. In a soft handoff environment, communication with the subsequent base station is established before terminating communication with the original base station. U.S. Pat. No. 5,267,261, which is incorporated by reference and assigned to the assignee of the present invention, discloses a method and system for providing soft handoff.

Figure 5:
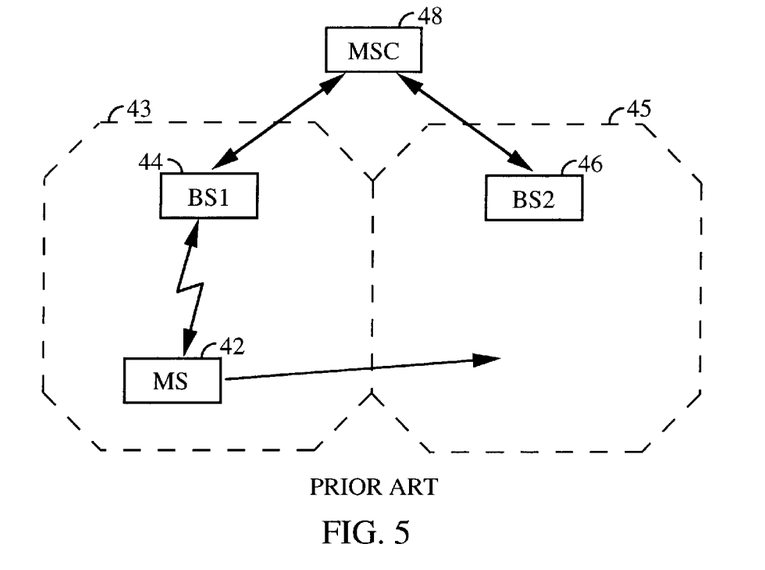
FIG. 5 is a block diagram illustrating an exemplary hard handoff scenario in a cellular telephone system.
Figure 6:
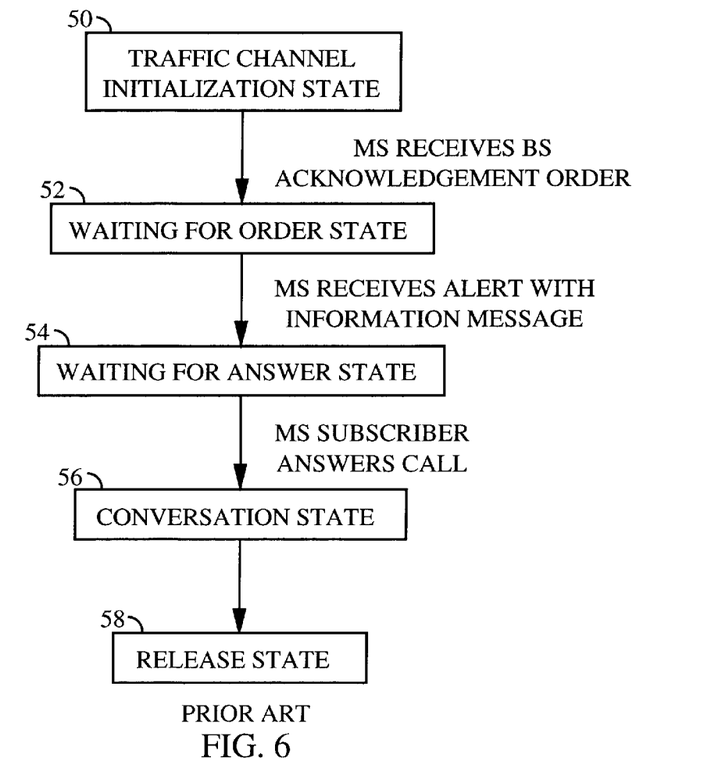
FIG. 6 is a state diagram illustrating the states of a mobile station in a mobile station terminated call.

The hard handoff procedure in a mobile terminated call may be understood with reference to FIGS. 5 and 6. As illustrated in FIG. 5, as MS 42 moves from the coverage area of BS1 44 to BS2 46, a connection needs to be established between MS 42 and BS2 46 while MS 42 needs to be disconnected from BS1 44. Both BS1 44 and BS2 46 are shown to be connected to MSC 48 in FIG. 5. However, it should be understood that a hard handoff can also occur when a mobile station moves from the control of one mobile switching center to another. In fact, the different mobile station controllers may support different modulation techniques such as TDMA or FDMA.

In FIG. 6, the states of a mobile station in a mobile terminated call are briefly illustrated. The states are summarized herein and explained more fully in the aforementioned document IS-95-A, pages 6–160 to 6–161.

The progression of the hard handoff procedure is dependent on the state of the mobile station. Referring to FIG. 6, in a mobile station terminated call, the mobile is in the Traffic Channel Initialization State, shown by block 50, when a traffic channel has been established between a mobile station and a base station. Upon receipt of a Base Station Acknowledgment Order from the base station, the mobile moves into the Waiting For Order State, shown by block 52. The mobile station then transitions into the Waiting For Answer State, illustrated by block 54, when it receives an Alert With Information Message from the base station. When the mobile station subscriber answers the call by pushing a specific key on the mobile station keypad, the mobile transitions into the Conversation State, represented by block 56. The mobile transitions into the Release State, shown by block 58, when conversation terminates.

According to the current procedure, a mobile station should be in the Waiting For Answer State 54 or the Conversation State 56 during hard handoff. If the mobile is in any other state, the call is likely to be dropped during hard handoff. Thus, the mobile station must receive an Alert With Information Message transmitted by the base station on the Air-Interface before the mobile station undertakes handoff. Otherwise, the handoff procedure would be unreliable. Referring again to FIG. 5, assume that MS 42 is in the coverage area of BS1 44. If MS 42 subsequently moves from the coverage area of BS1 44 to the coverage area of BS2 46 while MS 42 is in the Waiting For Order State 52, MS 42 may not receive the Alert With Information Message sent by BS1 44. Without receiving the Alert With Information Message, MS 42 cannot transition into the Waiting For Answer State 54 in the coverage area of BS2 46. As a result, the call will be dropped while handoff is in progress. Thus, the present invention recognizes that a better method for handling hard handoff in a mobile station terminated call is necessary.

As previously described, providing an Alert With Information Message on the A-Interface overcomes the shortcomings in the call waiting procedure. The present invention recognizes that providing an Alert With Information Message on the A-Interface will also overcome the shortcomings in a hard handoff procedure in a mobile station terminated call. Further, it should be understood that the present invention applies to hard handoff procedures in a variety of communication environments, including CDMA, TDMA, or FDMA.

Figure 7:
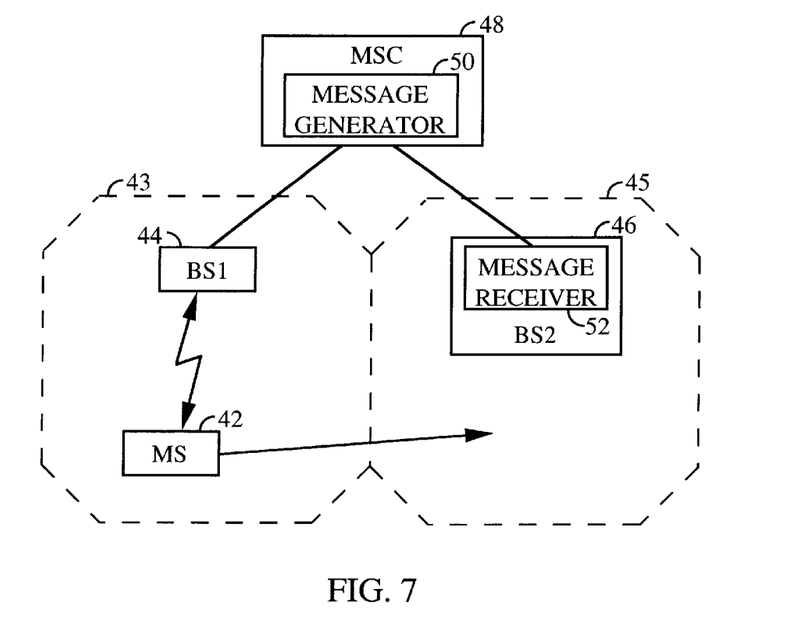
FIG. 7 is a block diagram illustrating an exemplary embodiment of the hard handoff scenario according to the present invention.
Figure 8:
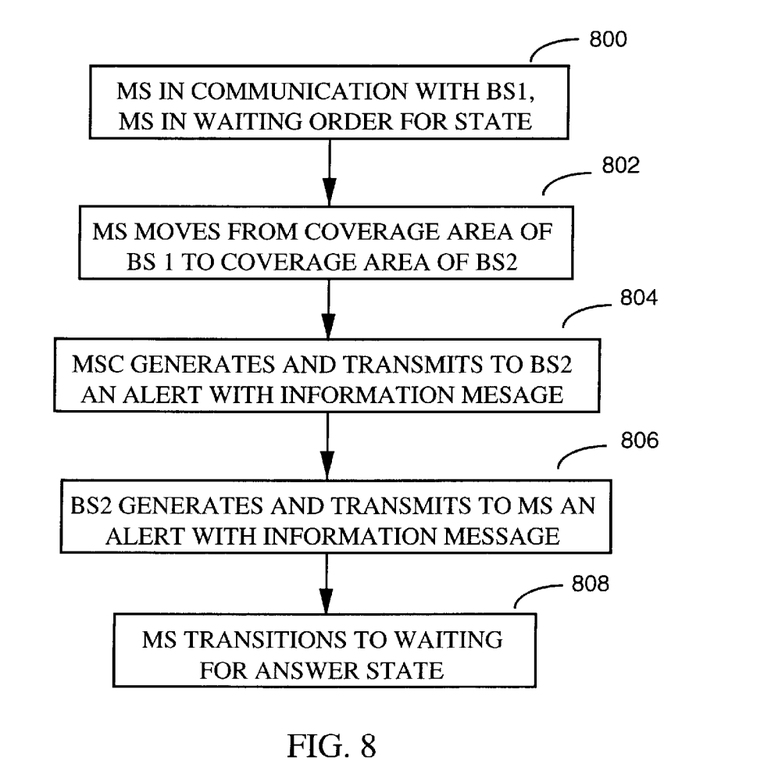
FIG. 8 is a flow chart illustrating an exemplary embodiment of the processing steps involved in hard handoff as implemented by the processing elements of FIG. 3.

A preferred embodiment of the use of an Alert With Information Message on the A-Interface in a hard handoff procedure is illustrated in FIG. 7 with reference to FIG. 8. An Alert With Information Message is generated by message generator 50 in MSC 48 and sent to message receiver 52 in BS2 46. The Alert With Information Message is sent on the A-Interface when MS 42 is moving from the coverage area of BS1 44 to the coverage area of BS2 46 while in the Waiting For Order State. After BS2 46 receives the Alert With Information Message from MSC 48, BS2 46 then sends an Alert With Information Message to MS 42 on the Air-Interface. Having received the Alert With Information Message, MS 42 can transition into the Waiting For Answer State 54 while in the coverage area of BS2 46, and handoff can occur without the call being dropped. Thus, by providing for an Alert With Information Message on the A-Interface, MSC 48 has better control of the hard handoff procedure. Since MSC 48 can send the Alert With Information Message to BS2 46, causing BS2 46 to send the Alert With Information Message to MS 42, MS 42 does not need to rely on receiving the Alert With Information Message from BS1 44 in order to transition into the Waiting For Answer State 54. Consequently, handoff can occur without the call being dropped.

The present invention recognizes that for the call-waiting and hard handoff procedures, there are certain deficiencies in call processing on the A-Interface as currently defined by IS-634. By providing an Alert With Information Message on the A-Interface, the present invention overcomes these deficiencies. The Alert With Information Message is already available on the Air-Interface under IS-95-A to cause a mobile station to transition from the Waiting For Order State to the Waiting For Answer State. An Alert With Information Message is provided on the A-Interface to trigger the transmittal of the Alert With Information Message on the Air-Interface, solving the problems of the call-waiting and handoff procedures.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A cellular communication system, comprising:

a mobile station;

a first base station in communication with said mobile station via an Air-Interface, said first base station defining a first cellular coverage area;

a mobile switching center in communication with said first base station via an A-Interface;

a message generator at said mobile switching center for generating a message signal for transmission to said first base station on said A-Interface;

a message receiver at said first base station for receiving said message signal, wherein upon receipt of said message signal, said first base station transmits a subsequent message signal to said mobile station on said Air-Interface; and a second base station defining a second cellular coverage area;

wherein said message signal is generated and sent to said first base station while said mobile station is moving from said second cellular coverage area to said first cellular coverage area and while the call processing state of said mobile station is a waiting for order state;

wherein said mobile station is in hard handoff with said first and second base stations; and wherein, upon receipt of said subsequent message signal by said mobile station, said mobile station transitions into a waiting for answer state while said mobile station is in said first cellular coverage area.

2. A method for messaging between a mobile switching center and a base station, comprising the steps of:

generating a message signal in said mobile switching center;

transmitting said message signal to said base station on an A-Interface, wherein upon receipt of said message signal, said base station transmits a subsequent message signal to a mobile station on an Air-Interface;

establishing communication between a previous base station and said mobile station;

processing a call between said previous base station and said mobile station such that said mobile station is in a waiting for order state; and after receipt of said subsequent message signal by said mobile station, transitioning said mobile station into a waiting for answer state while said mobile station is in the coverage area of said base station;

wherein said message signal is generated by said mobile switching center and sent to said base station while said mobile station moves from said previous base station to said base station while in said waiting for order state; and wherein said mobile station is in hard handoff with said previous base station and said base station.

3. A telecommunications messaging system, comprising:

a message generator in a mobile switching center for generating a message signal, said message signal for transmission to a base station for triggering said base station to transmit a subsequent message signal to a mobile station; and a message receiver in said base station for receiving said message signal;

Wherein said subsequent message signal indicates to said mobile station to transition into a waiting for answer state while said mobile station is in a waiting for order state in response to a previous message signal from a separate base station.

4. The telecommunications messaging system of claim 3 wherein said message signal is an alert with information signal.

5. The telecommunications messaging system of claim 3 wherein said mobile station executes a hard handoff between said separate base station and said base station.

6. The telecommunications messaging system of claim 3 wherein said message signal is sent from said mobile switching center to said base station over an A-interface.

* * * * *